United States Patent [19]

Jackson

[11] 4,373,917
[45] Feb. 15, 1983

[54] EDUCATIONAL DEVICE FOR TEACHING ARITHMETICAL OPERATIONS

[76] Inventor: Priscilla H. Jackson, 824 Dorian Rd., Westfield, N.J. 07090

[21] Appl. No.: 267,752

[22] Filed: May 28, 1981

[51] Int. Cl.³ .......................... G09B 1/06; G09B 19/02
[52] U.S. Cl. ................................................ 434/209
[58] Field of Search ............. 434/190, 191, 192, 208, 434/209, 210, 167, 348

[56] References Cited

U.S. PATENT DOCUMENTS

| | | | |
|---|---|---|---|
| 2,369,804 | 2/1945 | Schoolfield et al. | 434/167 |
| 2,751,690 | 6/1956 | Cohen | 434/209 |
| 2,899,756 | 8/1959 | Wise | 434/208 |
| 2,936,531 | 5/1960 | Pennell | 434/209 |
| 2,971,275 | 2/1961 | Provenzand | 434/191 |
| 3,192,650 | 7/1965 | Torchia | 434/209 |
| 3,276,151 | 10/1966 | Smith | 434/190 |
| 3,339,297 | 9/1967 | Stinn et al. | 434/190 |
| 3,452,455 | 7/1969 | Judge | 434/209 X |
| 3,514,873 | 6/1970 | Stobbe | 434/190 |
| 3,541,702 | 11/1970 | Cohen | 434/348 |

*Primary Examiner*—William H. Grieb

[57] ABSTRACT

An educational device is described for teaching arithmetical operations which comprises: a graph-like base member having a set of four symbols positioned in the upper region thereof, namely, a division symbol, a multiplication symbol, a subtraction symbol and a downwardly pointing arrow. A plurality of movable members are applied onto the graph-like base member and have depicted on at least one main surface thereof such indicia as numerals from 0 through 9, preselected letters of the alphabet, punctuation symbols or mathematical process signs. Several horizontal separation bars of predetermined length and having a width equal to at least about one-third the width of the movable members are employed; at least one of these separation bars is longer then the others and has an L-shaped configuration. A plurality of arrow-like members of varied length and of width substantially equal to the width to the horizontal bars completes the components of the educational device of the invention.

10 Claims, 4 Drawing Figures

EDUCATIONAL DEVICE FOR TEACHING ARITHMETICAL OPERATIONS

BACKGROUND OF THE INVENTION

1. Field of the Invention

The present invention relates to instruction means for teaching arithmetical operations and, more particularly, to a teaching device for the instruction of pupils in the long division and long multiplication of numbers and optionally other arithmetical operations, such as addition, subtraction, etc.

2. Description of the Prior Art

Many devices and visual aid means are known for teaching pupils, especially precocious children, learning disabled, and other exceptional individuals, basic arithmetical operations. Generally, this is effected by means of educational toys or tutoring devices which, although exploiting the idea of visual aids, are limited to illustrative example and do not require the participation of the pupil in the learning process.

Thus, a first group of known devices is generally in the form of toys which will aid a child in learning more of a subject such as aritmetical problems and which are primarily concerned with self-teaching techniques, since only the proper answer can usually be placed in the area constructed for receiving the answer. Illustrative of such devices is U.S. Pat. No. 2,971,275 issued Feb. 14, 1951 to D. Provenzano, wherein the toy is so constructed that the fixed answer for the fixed and predetermined problem is usually structurally different from all other answers so as to combine the correct solution with the correct shape. Although these types of devices are manipulated by the pupil himself, they lack completely the ability of teaching the abstract concepts of mathematical operations.

Another aspect of teaching devices is the one directed to tutoring mathematics by means of tables which are manipulated by the student individually and are intended to test and familiarize the student with arithmetical relations. Typical of these devices is U.S. Pat. No. 2,899,756 issued Aug. 18, 1959 to P. H. Wise, in which a board has a cut-out center or recessed portion within which a plurality of cards each proportioned to fit into the recess is inserted and a plurality of numbered blocks is adapted to be placed in the recess upon a card filled therein, the cards each having indicia thereon indicating the proper order in which the cards should be placed in the recess, the indicia being in the form of arithmetical problems to which the numbers on the blocks form solutions. As clearly understandable, this type of device is a testing or examination means for strengthening the pupil's already basic knowledge of mathematics. It does not teach the necessary abstract concepts of mathematical operations but assumes that the student be already familiar with such concepts.

Still another type of educational devices, typified by U.S. Pat. No. 3,541,702 issued Nov. 24, 1970 to J. G. Cohen, utilizes book-like means or devices containing a set of transparent pages with indicia provided on like sides of each successive page, in series, so as to illustrate step by step the solution of a problem or the development of a particular system by superimposition of the pages and of the transparencies. While this system might be useful in developing the basic concept of a given operation it lacks the ability of manipulation of the teaching aid by the student and the versatility of participation by a student in modifications and changes of a problem. It is more similar to a blackboard or rather a series of blackboards than to a means for the direct learning process of a student.

Other educational devices, believed to be more closely related to my invention are typically illustrated by U.S. Pat. No. 2,936,531 issued May 17, 1960 to J. K. Pennell, Jr. and U.S. Pat. No. 3,192,650 issued July 6, 1965 to G. R. Torchia. Both of these devices, however, are directed to specific mathematical problems and therefore cannot be adapted to concepts other than those for which they are specifically devised. The former is strictly related to teaching decimal positions in long divisions; it does not extend its visual aid teaching ability to the basic concept of mathematical operations, nor is it suitable for a complete development of division operations. Similarly, the latter is directed and restricted to teaching fractions and cannot be applied to long divisions or to the development of the operation itself. Perhaps the most interesting prior art of which I am aware is U.S. Pat. No. 3,452,455 issued July 1, 1961 to T. H. Judge, wherein a board for mathematical instruction is disclosed which includes a stationary board and a movable panel, the panel having an extending part on which can be written certain numerals to be moved adjacent to other numerals on the stationary part for each in teaching the computation, particularly of division. Although this prior art attempts to depict the division process in simplified form, it does not involve the gross motor response which my invention requires in placing each numeral, or the specific symbols to be followed for each step. Furthermore, it does involve the need for writing ability thus excluding a whole age of children and entire groups of students; it is restricted by economy to particular sizes and it is limited solely to the teaching of divisions.

SUMMARY OF THE INVENTION

It is, therefore, an object of my invention to overcome the above mentioned drawbacks of the prior art by providing an educational device for teaching mathematics, especially long divisions and multiplications, which is economical and simple to operate and involves the gross motor response of the pupil.

It is another object of my invention to provide a teaching device which, by means of a visual aid, leads the student step by step through the abstract mechanics of the mathematical operation by means of check symbols which prevent the student from getting "lost" in the process of a computation.

It is a further object of my invention to provide a visual aid mathematical teaching device which requires the participation of the student in the learning process and is suitable for normal children, precocious very young children as well as for learning disabled, and other exceptional individuals.

Briefly stated, the object of my device is to provide an arrangement wherein a large mathematical problem involving a dividend and a divisor, for instance, can be broken down into one component part at a time or into consecutive steps which enable the student to learn the abstract mechanics and functions of mathematics. The device of my invention essentially consists of a large graph-like base member, suitably a base board, a predetermined number of packets of numerals from zero through 9, optionally a rack for holding said packets for ease of retrieval, at least one remainder card, a number of special "cross-out" cards required for the substraction process, at least two decimal point cards, at least 2 channel-like decimal movers, a number of substraction and/or addition and/or multiplication bars, at least two multiplication and/or addition sign cards, a number of arrows of different lengths, at least one question mark starter card and at least one long division symbol suitable for, typically, a seven digit dividend. By the term "graph-like base member" is intended a member having or forming a configuration consisting of a plurality of squares or rectangular individual boxes.

These and other objects of my invention will become more readily apparent from the following detailed description of embodiments thereof taken in conjunction with the accompanying drawings.

DETAILED DESCRIPTION OF THE INVENTION

Figure 1:
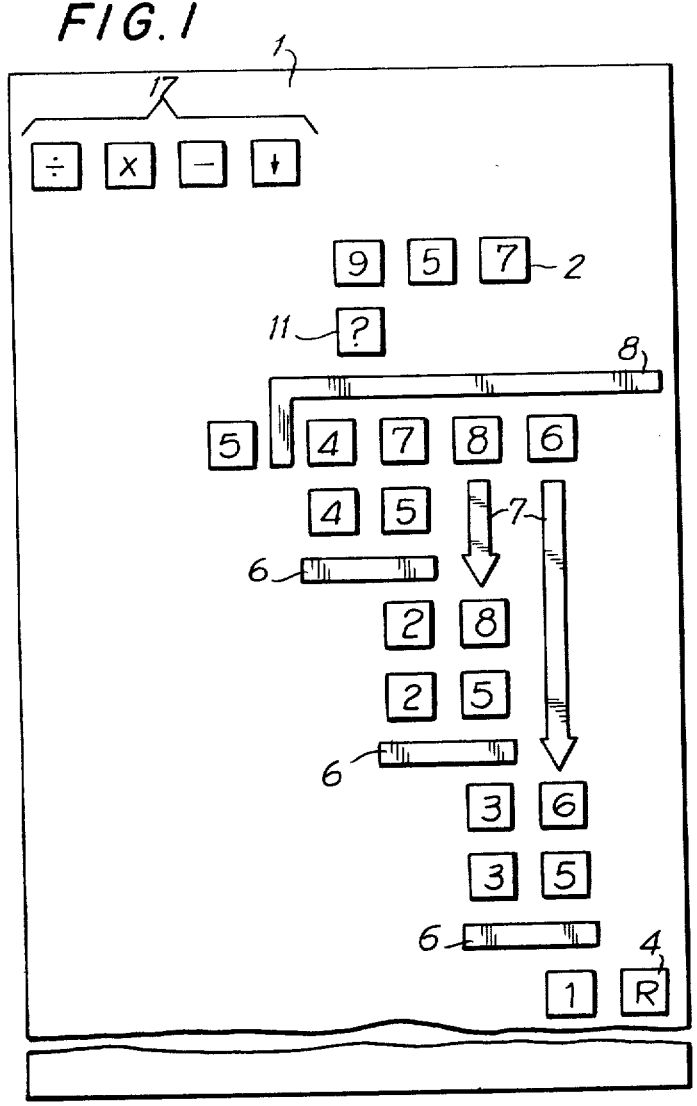
FIG. 1 is a front elevational view of my device showing a typical division operation.

With reference to the accompanying drawings, the teaching device of my invention comprises: a base graph-like member 1 onto which a number of movable components 2 may be placed about. The size and the shape of the base member may vary considerably. Thus, for example, one may utilize only a single large board for use either by the teacher as a blackboard or by a group of students gathered around it; it is also possible to have one larger board for the instructor accompanied by a number of smaller boards for the individual students; the graph-like member may be actually variable in overall surface area during the process of arithmetical computations, its borders and its configuration being defined by the individual component "cards" (in this case, optionally and preferably, in the shape of tiles or cubes). The material employable may be any suitable material such as cardboard or cloth or plastic or wood, or—as stated hereabove—it may consist of the very component tiles, cards or cubes constituting the movable components. It may be used hanging, in which case the component parts may optionally be magnetically applied; it may be used on a flat surface, in which case it may be rigid or it may be flexible; it may be made of cloth, in which case it becomes foldable, rollable or portable; it may be made of velcro material in which case the component parts are self-adhering. In other word, the variety of materials, sizes and utilizations is practically limitless so to speak. A practical size of the board 1 (using the division as an example) is usually one which contains 16 columns, typically divided into 7 columns for the dividend, three columns on the right hand side for the possible eventual remainder and six columns on the left hand side for the divisor. The length of the base member 1 is naturally proportional to its width; thus, for example, if a 7-digit dividend is utilized one might consider a length corresponding to 22 horizontal rows of squares. The component parts which are applied to, moved on or shuffled about the base member comprise: a predetermined number of cards (tiles or cubes) 2, suitably sized to correspond substantially to the size of each square or rectangle and made of material conveniently suitable to the material of which the base member is made, each card having thereon, at least on one side and preferably on both sides, a numeral from 0 through 9, or the letter R, or a multiplication sign and/or addition sign, or a diagonal cross bar, or a question mark, or a period. Somewhat larger quantities or packets of cards with numerals thereon (0–9) than non-numerals are necessary in order to carry out satisfactorily a mathematical operation. Usually a packet may consist of a dozen or so cards, each packet being suitably kept in orderly fashion on a suitable supporting rack (not shown) made of suitably hard material, such as wood or cardboard or plastic, the rack being separate and distinct from the base member for obvious convenience in use and positioning. Furthermore, such rack is optional in that the packets of cards may be layed about the table or board-supporting surface if so desired. It can be readily seen that when tile or cubes are used, the rack may be replaced by a more suitable container such as a box. And if cubes are employed, their total number may be reduced, because each cube having six surfaces, corresponds to six cards or at least to three cards. Two or more cards 4 are marked with the letter "R" and are utilized to indicate the "remainder" in a mathematical operation. A number of "cross-out" cards bearing a diagonal cross bar 5 may be employed during complicated substraction operations, as indicated illustratively in FIG. 2. A predetermined number of substraction bars 6 (or respectively addition bars in the case of addition and/or multiplication operations) are used; in practical cases, the length of such bars suitably corresponds to two squares because I have found that such a length may be satisfactorily utilized whether the subtrahend contains 1, 2 or 3 digits. However, the length of bar 6 should be longer in a multiplication process. Usually also six to nine of these bars will suffice. Typically, six arrows (called "bring-down" arrows) of different length are necessary in the division process, assuming again a width of the base member of 16 squares. The six arrows 7 correspond to 1, 3, 5 and subsequent odd number of squares as it is readily visible from FIG. 1. The size of both bars 6 and arrows 7 is suitably kept at ⅓ to ½ the width of a square in order to visually maximize the purpose thereof. Also useful is to have a color contrast between bars and arrows on the one hand and cards on the other, so as to keep the various operations of the process clearly distinct and separate from one another. One long division symbol 8 is used as the center focal point of the division operation (see FIG. 1), said symbol 8 being preferably printed on the board and substantially L-shaped with the shorter leg pointing downwardly and separating the dividend from the divisor and the longer leg, for example corresponding to 10 square for a 16-square board, separating the dividend from the quotient. To teach multiplication, the symbol 8 is replaced by an extra long bar which suitably may be almost as long as the width of the board.

Another card has represented thereon a question mark (?) 11, which is to serve as a starter, as will be indicated and explained hereinbelow. Another group of cards will have a period (.) 12 illustrated thereon which cards will be utilized during the teaching of the decimal point operation. Finally, a series of channel-like symbols 13 of varied width may optionally be employed to teach, during a division operation, the correct positioning of the decimal point in the quotient of the division. The amplitude of the channel-like component, which has at its right extremity an arrow terminal 14 varies depending on the number of decimal digits in both dividend and divisor. Consequently, if the components are made of such material as cloth or paper at least two members 14 for each different width are necessary; conversely, if the material is rigid, such as plastic or wood, these components may be made telescopically slidable so as to vary the width thereof at will by simply pulling their ends apart. The same will obviously apply to such other components as the long division symbol 8, the muliplication long bar 9 and/or the bring-down arrows 7. Card 15 represents the multiplication symbol (×) and is utilized in the teaching of this operation. Finally one last remaining card is card 16 which represents the addition symbol (+) which is utilized in the teaching of this operation.

Figure 3:
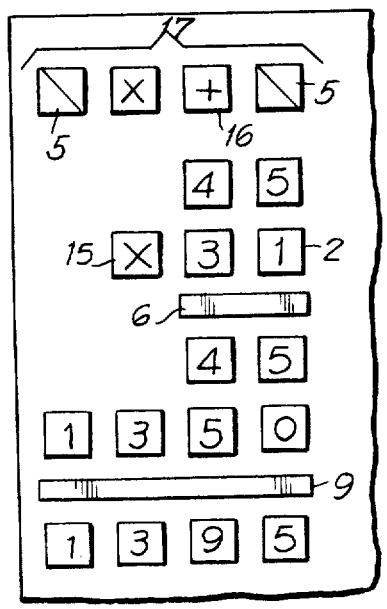
FIG. 3 is a front elevational view showing the device of my invention in a multiplication operation.

The base member 1, when utilized in teaching a division, will show in the upper portion thereof typically at 17 in sequence or sequential order a division sign, a multiplication sign, a substraction sign and an arrow. Since this teaching device is geared to help an individual to learn the process of the division operation, as each step is taken, the student must refer to the symbols hereinabove indicated and shown at the top of the base board. The various symbols signify a division step (÷), a multiplication step (×), a substraction and comparison step (−) and a "bringdown" operation (↓). Again and again these steps are repeated until the problem is complete. If in doubt about which next step has to be taken, the student will look at the last card placed on the graph board and decide which step this operation completed and then check the symbols hereabove discussed at the top of the graph sheet to see which step comes next. This is the key which simplifies a division for the student who becomes "lost" in the mathematical process. Thus, the division symbol indicates that the first step or operation to be taken is a division operation, namely the calculation of the first digit of the quotient. After this operation is performed, the student looks at the base member and sees the second symbol (×) which alerts him that the next operation is a multiplication operation, namely the multiplication of the first digit of the quotient by or times the divisor. After this second operation is performed, again the four symbols on top of the base member indicate that the third operation is the subtraction and a comparison operation combined. The subtraction relates to the performance of the first substraction operation, (see FIG. 1 above numeral 6) and the comparison whether the remainder from such substraction operation is or is not smaller than the divisor. Finally, the student is being shown that the next step is the bringing down of the arrow of the next digit of the dividend in the division operation. When a multiplication instead is being taught, cards with the diagonal cross bar 5 are superimposed on two of the four symbols, quartet 17 as indicated in FIG. 3 in order to eliminate possibly confusing operations. Optionally, a card showing a + sign may be used in which case it is superimposed on the − sign of the quartet 17.

Obviously, when setting up a problem, the teacher or the student should choose first a simple divisor such as 5 or 2 and this will allow the student to concentrate on the process rather than on basic facts which may not be recalled as quickly. Referring for a moment to a division operation, it behooves to start with dividends that do not give a remainder and then proceed step by step to examples with remainders in which case the "R" card 4 will be placed to the right of the quotient or adjacent the remainder in the final subtraction step. It is to be observed that the length of the division symbol 8 will increase the enjoyment of the student in working with larger dividends (up to 7 digits or more are allowed with a 16 column board) and such long dividends should be used when the student is capable of following the process of the four steps indicated at 17 on the upper part of the base member. In this manner, the student is fully enabled to carry out its own imaginative problems, and to learn in the process.

Figure 2:
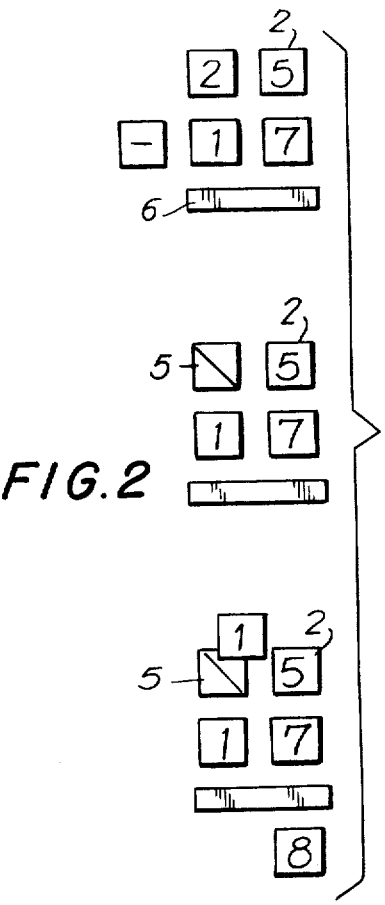
FIG. 2 is a detailed representation of the use of the cross-out card in the process of substraction.

If during a subtraction operation or step a student cannot master a subtraction, and this is the case when usually a digit of the subtrahend is greater than that of the minuend, without recurring to the so-called "regrouping", a cross-out card 5 (card with the diagonal bar) is provided to help with this abstract concept. The student uses the cross-out card as indicated in FIG. 2. Illustratively, since 7 is greater than 5 and cannot be subtracted therefrom, the student places a cross-out card 5 over the digit 2 and superimposes it partially with a card with a numeral 1 so as to change the 5 into a 15, thus simplifying the subtraction operation, so that 7 can now be readily substracted from 15. The cross-out card is then covered with a "1" to signify the one ten which remains.

In order to learn "where" the quotient or answer to the division begins, (see FIG. 1) a student will ask himself whether the divisor (5) "fits" into the first digit of the dividend (4) and since in this case it does not, whether the divisor (5) "fits" into the combination of the two digits of the dividend (47). Since the answer in this latter case is in the affirmative, the student will place above the bar 8 and directly above the second digit of the numeral (47) the question mark card 11 which identifies that here is the starting point of the answer or quotient. After having performed this first operation, the student will multiply the first digit of the quotient (9) times the divisor (5) and enter the answer (45) under the respective first two digits of the dividend (47). Hence, after having placed a subtraction bar 6 thereunder, the student will perform the subtraction operation and place the remainder (2) under the bar. He will then utilize an arrow 7 and bring down the next digit of the dividend (8) to form another dividend entity (28) and then return to the first of the four operations indicated at 17 on the base board. After the division is completed, he will place, if the case so indicates a remainder "R" card adjacent to the remainder of the division operation.

Figure 4:
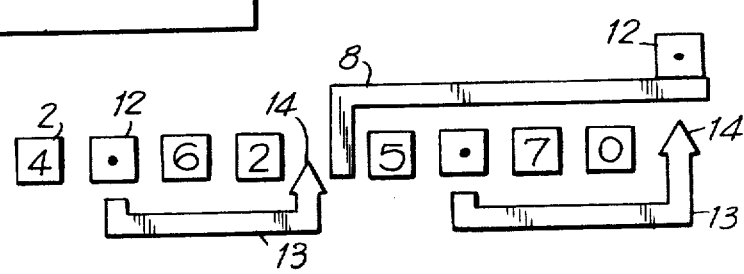
FIG. 4 is a detailed illustration of the use of the decimal point in a typical division operation.

Utilizing the same mathematical concepts and procedure, the student may perform a long multiplication or addition. Typically, the student will place on the base member 1 on two preselected rows the two numbers to be multiplied by each other, and to the left the card representing the multiplication symbol 15 and will place thereunder the multiplication bar (or respectively an addition bar) 9. Following conventional teaching techniques he will place the various component cards on the graph paper or board and effect the multiplication operation as illustratively indicated in FIG. 3. To illustrate the multiplication process (FIG. 3), a multiplicand of 45 will be placed appropriately above the multiplier of 31. To initiate the process, the product of 45 times one is 45. The product of 45 times 3 tens is 1,350. A one card (representing 100) is "carried" and placed above the multiplicand, to be added to the product of 4 tens and 5 ones, times 3 tens. The two products, 45 and 1,350 become addends with a resulting product of 1,395. If either a division or a multiplication is to be effected which involves the use of a decimal period 12 the teaching aid of my invention shows how simply this concept may be mastered, as indicated illustratively in FIG. 4. Assuming that the divisor is 4.62 and that the dividend is 5.70 and observing that the first digit of the divisor is smaller than the first digit of the dividend, then a channel-like component 13 having a length corresponding to 3 spaces or squares in the base member will be placed with its tail terminal under the period (.) card 12 so as to indicate that the decimal period has been displaced by two digits, namely after the numeral card (2). Similarly, another channel-like element 13 of equal length will be placed under the first digit of the dividend so that the arrow like terminal 14 will show the position at which the decimal point of the quotient will come to rest. Since now 462. "fits" into 570. one time, the first digit of the quotient (1) will be placed on the left hand side of the decimal period.

From the above it can be readily seen that the teaching device of my invention presents the heretofore unavailable advantages of: (a) enabling because of the gross motor movement involved a larger group than heretofore possible of persons of the most disparate intellectual abilities to learn the four operations; (b) allowing the student to participate in the learning process of manipulating the component parts as well as by rearranging and modifying the operations so as to render them more or less difficult; (c) offering a great versatility of applications and utilizations of the device as hereinbefore described and, in a nutshell, (d) offering a tool necessary to resolve many of the hereinbefore unsolvable problems.

It is to be understood however that, without exiting from the scope of the invention, many alterations and modifications of the device and of its components are possible and that the invention as hereinafter claimed is understood to protect all of such modifications and alterations. Having thus described my invention, what I claim and desire to obtain by Letters Patent is setforth in the accompanying claims.

What I claim is:

1. An educational device for teaching large division and multiplication operations which comprises in combination:
   (a) a graph-like base member having a set of 4 symbols positioned in the upper region thereof, said symbols consisting of a division symbol, a multiplication symbol, a subtraction symbol and a downwardly pointing arrow;
   (b) a plurality of movable numbers to be applied onto said graph-like base member and having depicted on at least one main surface thereof numerals from 0 through 9, pre-established letters of the alphabet, punctuation symbols or mathematical process signs;
   (c) a plurality of bars of predetermined length and having a width equal to at least about one-third the width of said movable members, at least one of said bars being longer than the others and having an L-shaped configuration;
   (d) a plurality of arrow-like members of varied length and of width substantially equal to the width of said bars.

2. The device according to claim 1 wherein said movable members have represented thereon either a numerical symbol ranging from 0 through 9 or a diagonal bar or the letter R or a question mark.

3. The device according to claim 1 further including cards which have represented thereon the multiplication symbol or the addition symbol or a period.

4. The device according to claim 1 further including a plurality of channel-like members having width substantially equal to the width of said bars and said arrows, said channels having an arrow-like terminal and having a trough of different length.

5. The device according to claim 1 wherein the length of said arrow-like members is equal to an odd number of graph spaces.

6. The device according to claim 1 wherein the ratio of the number of spaces in the width and length of said base member is 16:22.

7. The device according to claim 1 wherein said bar members have a length corresponding to 3 graph spaces.

8. The device according to claim 1 wherein said L-shaped bar member has the shorter leg equal to 1 graph space and said longer leg equal to at least 7 graph spaces.

9. The device according to claim 1, wherein said four symbols, $\div \times - \downarrow$ are fixedly applied to said base member in the upper region thereof.

10. The device according to claim 1, wherein said movable members are rectangular on each surface thereof and are selected from the group consisting of cards, tiles and cubes.

* * * * *